United States Patent
Zhu et al.

(10) Patent No.: US 9,317,550 B2
(45) Date of Patent: Apr. 19, 2016

(54) QUERY EXPANSION

(71) Applicant: Alibaba Group Holding Limited, Grand Cayman, KY (US)

(72) Inventors: Li Zhu, Hangzhou (CN); Jing Dong, Hangzhou (CN); Yunping Huang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 256 days.

(21) Appl. No.: 13/945,754

(22) Filed: Jul. 18, 2013

(65) Prior Publication Data

US 2014/0025701 A1 Jan. 23, 2014

(30) Foreign Application Priority Data

Jul. 20, 2012 (CN) .......................... 2012 1 0254810

(51) Int. Cl.
*G06F 17/30* (2006.01)
(52) U.S. Cl.
CPC .... *G06F 17/30389* (2013.01); *G06F 17/30672* (2013.01); *G06F 17/30864* (2013.01)
(58) Field of Classification Search
CPC ............... G06F 17/30672; G06F 17/30864; G06F 17/30389
USPC .......................................................... 707/765
See application file for complete search history.

(56) References Cited

U.S. PATENT DOCUMENTS

| 2004/0158560 | A1 | 8/2004 | Wen et al. |
| 2005/0149499 | A1 | 7/2005 | Franz et al. |
| 2006/0253427 | A1* | 11/2006 | Wu et al. ........................... 707/3 |
| 2008/0071740 | A1 | 3/2008 | Jhala et al. |
| 2008/0077585 | A1 | 3/2008 | Li et al. |
| 2008/0208841 | A1 | 8/2008 | Zeng et al. |
| 2010/0205200 | A1 | 8/2010 | Hsieh et al. |
| 2011/0145226 | A1 | 6/2011 | Gollapudi et al. |
| 2011/0258212 | A1 | 10/2011 | Lu et al. |
| 2011/0264682 | A1 | 10/2011 | Song et al. |
| 2012/0010996 | A1 | 1/2012 | Horvitz et al. |
| 2012/0173562 | A1 | 7/2012 | Zhu et al. |
| 2012/0226641 | A1 | 9/2012 | Hu et al. |

OTHER PUBLICATIONS

Sofia Stamou, Retrieval Efficiency of Normalized Query Expansion, 2005, Springer-verlag Berlin Heidelberg, CICLing 2005, LNCS 3460, p. 604-607.*
Baeza-Yates, et al., "Query Recommendation Using Query Logs in Search Engines", Lecture Notes in Computer Science/Computational Science (Eurocrupt) CHES 2002, Springer, DE, vol. 3268, Mar. 18, 2004, pp. 588-596, retrieved from the internet at http:..dx.doi.org/10.1007/978-3-540-30192-9_58.
PCT Search Report and Written Opinion mailed Aug. 29, 2013 for PCT application No. PCT/US13/51140, 13 pages.
Zhang, et al., "Mining search engine query logs for social filtering-based query recommendation", Applied Soft Computing, Elsevier, Amsterdam, NL, vol. 8, No. 4, Sep. 1, 2008, pp. 1326-1334.

* cited by examiner

*Primary Examiner* — Thu-Nguyet Le
(74) *Attorney, Agent, or Firm* — Lee & Hayes, PLLC

(57) ABSTRACT

The present disclosure provides example query expansion methods and systems. A query input by a user is received. A normalized query of the query is determined according to the query. The normalized query is used as an expansion term of the query to implement query expansion. For example, session information in a search log of the user is obtained. All queries appearing in a single session are obtained and a number of votes for each query is calculated or counted. A vote similarity between a single query and a target query is determined and a correlation degree between the single query and the target query is determined according to the vote similarity. A normalized query of the target query is determined according to the correlation degree. The present techniques accurately expand queries and reduce query times, thereby improving system response speed and processing efficiency.

20 Claims, 8 Drawing Sheets

QUERY EXPANSION

CROSS REFERENCE TO RELATED PATENT APPLICATIONS

This application claims foreign priority to Chinese Patent Application No. 201210254810.0 filed on 20 Jul. 2012, entitled "Query Expansion Method and System," which is hereby incorporated by reference in its entirety.

TECHNICAL FIELD

The present disclosure relates to the field of computer data processing, and more specifically, to a query expansion method and system.

BACKGROUND

With the development of network technologies, search engines have been continuously improved and various information may be obtained from the Internet through the search engines. The search engines become one of the main methods to help a user to quickly obtain information at the Internet. A user submits a query term (Query) to a search engine, and the search engine returns search results corresponding to the query to the user.

At an e-commerce website, more particularly at a large e-commerce website, the user usually needs to use the query to search and find his/her desired products. As queries input by the user are usually formed according to a desire of the user, it may result in more or less results corresponding to the queries, thereby resulting in a low accuracy of the search results and frequent searches. Thus, the search engine may usually expand or rewrite the queries to enrich query information and optimize the queries input by the user intelligently, thereby improving the accuracy of the search results and simultaneously reducing pressure brought to a server due to frequent searches by the user.

Conventional query expansion methods include expansion at a query end and an index end. Expansion at the query end mainly includes addition, substitution, and deletion of the query. That is, a certain character or a certain part is added, substituted or deleted from the query input by the user. For example, if the query input by the user is "Nokia™ mobile phone," an adding operation may apply to the query to change it into "Nokia™ N95 mobile phone," a deleting operation may apply to the query to change it into "Nokia™" or "Mobile phone," or a substituting operation may apply to the query to change it into "Samsung™ mobile phone" or "Apple™ mobile phone," etc. Expansion at the index end mainly refers to synonym expansion of the query at the index end. A synonym set is usually obtained through conventional data mining. When a certain term appears, its synonyms are extracted from the synonym set for expansion. In order to ensure the accuracy of the search results and the query, a simultaneous expansion at the query end and the index end may be adopted. In other words, the query is expanded at both the query end and the index end respectively, and a result corresponding to the same expansion terms is selected as an expansion result.

During practical processing, the search engine may usually select the expansion terms at the query end one by one for searching according to a certain sequence, match the expansion terms with expansion terms at the index end, and return search results of the expansion terms if there is a match between the expansion terms. During this process, it is possible that there are multiple expansion terms at the query end while there is only an expansion term at the index end. Thus, according to the sequence, the last expansion term at the query end matches the query term at the index end. The search engine needs to search multiple times until the last expansion term at the query end matches the expansion term at the index end. Therefore, invalid search times of the search engine as well as time for a system to return the search results are increased, the system response speed is reduced, and system resource occupancy is increased.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a query expansion method and system. For example, the present technique may solve excessive searching times and system sources occupancy problems, which also influence a system response speed and efficiency, arising from repeated searching and matching queries by a search engine.

The present disclosure discloses an example query expansion method. A query input by a user is received. A normalized query of the query is determined according to the query. The normalized query is used as an expansion term of the query to implement query expansion.

The normalized query of the query may be determined by using the following methods. Session information in a search log of the user is obtained. All queries appearing in a single session are obtained and a number of votes for each query is calculated or counted. In a single session, according to a sequence of appearances of each query, any query appearing before a particular query is counted as one vote (to the particular query).

A vote similarity degree between a single query and a target query is determined according to a total number of votes of the target query in all sessions and a number of votes of the single query to the target query. A correlation degree between the single query and the target query is determined according to the vote similarity degree. A normalized query of the target query is determined according to the correlation degree between the single query and the target query.

For example, the total number of votes of the target query in all sessions may be calculated or counted as follows. One or more sessions including the target query are obtained. A number of votes of the target query in each session is calculated. The number of votes of the target query in each session is accumulated to obtain the total number of votes of the target query.

For example, the number of votes of the single query to the target query may be calculated or counted as follows. One or more sessions including both the single query and the target query are obtained. It is determined whether the single query votes the target query in a respective session. If a determination result is positive, the respective session is selected. A number of votes in the selected sessions are calculated to obtain a number of votes of the single query to the target query.

For example, the vote similarity degree between the single query and the target query may be determined as follows. A proportion of a total number of votes of the single query to the target query to a total number of vote scores of all the queries to the target query (with respect to a single product) as the vote similarity degree between the single query and the target query.

For another example, the vote similarity degree between the single query and the target query may also be determined as follows. A weight and a base number of each vote to the target query are determined. A score of each vote is calculated according to the weight and the base number. A proportion of total vote scores of the single query to the target query to total vote scores of all the queries to the target query is used as the vote similarity degree between the single query and the target query.

For example, the normalized query of the target query may be determined according to the correlation degree between the single query and the target query as follows. A threshold of the normalized query is set. If a value of the correlation degree value between the single query and the target query exceeds the threshold of the normalized query, the single query is determined as the normalized query of the target query.

For another example, the normalized query of the target query may also be determined according to the correlation degree between the single query and the target query as follows. Categories of the normalized query are divided into a synonymous normalized query, a correlated normalized query, and an expanded normalized query. Value ranges of the three categories are set according to correlation degree values in a descending order respectively. A category corresponding to a value range to which the correlation degree between the single query and the target query belongs is determined as a detailed category of the single query and the target query.

For example, before the correlation degree between the single query and the target query is determined according to the vote similarity degree, the method may further include the following operations. Click information of search results in the search log of the user is obtained. Search results including the target query are extracted from the click information. A click similarity degree between the single query and the target query is determined according to a number of total clicks of search results including the target query and a number of total clicks of search results including the target query and corresponding to the single query.

For example, the correlation degree between the single query and the target query may be determined according to the vote similarity degree and the click similarity degree.

For example, the correlation degree between the single query and the target query may be determined according to the vote similarity degree and the click similarity degree as follows. A larger value between the vote similarity degree and the click similarity degree is used as the correlation degree between the single query and the target query.

Alternatively, weights of the vote similarity degree and the click similarity degree are determined. The correlation degree between the single query and the target query is calculated based on the vote similarity degree and the click similarity degree as well as their respective weights in accordance with one or more preset rules.

For example, before determining the correlation degree between the single query and the target query according to the vote similarity degree, the method further includes the following operations. Seller data stored in a server is obtained. The seller data includes determined product description information when a seller describes a product. The seller data is analyzed and the query and a characteristic term of the query are extracted from the seller data. A characteristic similarity degree is determined according to the single query and the characteristic term of the target query.

For example, the correlation degree between the single query and the target query may be determined as follows. The correlation degree between the single query and the target query may be determined according to the vote similarity degree and the characteristic similarity degree.

For example, the correlation degree between the single query and the target query may be determined according to the vote similarity degree and the characteristic similarity degree as follows. A characteristic value of each characteristic term is calculated. The characteristic value is calculated according to click information of the characteristic term and its corresponding query. The characteristic similarity degree between the single query and the target query is calculated according to the characteristic value.

For example, before determining the normalized query of the target query according to the correlation degree between the single query and the target query, the method may further include the following operations. A semantic similarity degree and/or a category similarity degree between the single query and the target query are determined.

The normalized query of the target query may be determined according to the correlation degree between the single query and the target query as follows. The normalized query of the target query may be determined according to the correlation degree and the semantic similarity between the single query and the target query. Alternatively, the normalized query of the target query may be determined according to the correlation degree and the category similarity between the single query and the target query. Alternatively, the normalized query of the target query may be determined according to the correlation degree, the semantic similarity, and the category similarity between the single query and the target query.

For example, the determination of the semantic similarity between the single query and the target query may include the following operations. An edit distance between the single query and the target query is determined. The edit distance refers to a minimal number of edit operations to convert one term to another term. The edit distance is normalized to obtain the semantic similarity degree with a same quantitative level as the correlation degree.

The present disclosure also provides an example query expansion system. The system may include a query inputting module, a normalized query determining module, and a query expanding module.

The query inputting module obtains a query input by a user. The normalized query determining module determines a normalized query of the query according to the query. The query expanding module uses the normalized query as an expansion term of the query to implement query expansion.

The normalized query determining module may include a session information obtaining module, a query vote calculating module, a vote similarity degree determining module, a correlation degree determining module, and a normalized query determining module.

The session information obtaining module obtains session information from a search log of the user.

The query vote calculating module obtains all queries that appear in a single session, and counts votes for each query. In a single session, according to a sequence of appearances of each query, any query appearing before a particular query is counted as one vote (to the particular query).

The vote similarity degree determining module determines a vote similarity degree between a single query and a target query according to a total number of votes of the target query in all sessions and a number of votes of the single query to the target query.

The correlation degree determining module determines a correlation degree between the single query and the target query according to the vote similarity degree.

The normalized query determining module determines a normalized query of the target query according to the correlation degree between the single query and the target query.

For example, the vote similarity degree determining module may include a base number and weight determining unit, a score calculating unit, and a proportion calculating unit. The base number and weight determining unit determines a weight and a base number of each vote to the target query. The score calculating unit calculates a score of each vote according to the weight and the base number. The proportion calculating unit uses a proportion of a total number of vote scores of the single query to the target query to a total number of vote scores of all the queries to the target query as the vote similarity degree between the single query and the target query.

For example, the normalized query determining module may include a normalized query threshold setting unit that sets a threshold of the normalized query and determines the single query as the normalized query of the target query if a correlation degree value between the single query and the target query exceeds the threshold of the normalized query.

For another example, the normalized query determining module may include a normalized query category classifying unit, a value range setting unit, and a category determining unit. The normalized query category classifying unit divides normalized query categories into a synonymous normalized query, a correlated normalized query, and an expanded normalized query.

The value range setting unit sets value ranges of the three categories according to correlation degree values in a descending order.

The category determining unit determines a category corresponding to a value range to which the correlation degree between the single query and the target query belongs as a detailed category of the single query and the target query.

For example, the normalized query determining module may include a click information obtaining module, a search result extracting module, and a click similarity degree determining module. The click information obtaining module obtains click information of search results from the search log of the user. The search result extracting module extracts search results including the target query from the click information. The click similarity degree determining module determines a click similarity degree between the single query and the target query according to a number of total clicks of search results including the target query and a number of total clicks of search results including the target query and corresponding to the single query. The correlation degree determining module determines the correlation degree between the single query and the target query according to the vote similarity degree and the click similarity degree.

For example, the normalized query determining module may also include a seller data obtaining module, a data analyzing module, and a characteristic similarity degree determining module.

The seller data obtaining module obtains seller data stored in a server. The seller data includes determined product description information when a seller describes a product.

The data analyzing module analyzes the seller data and extracts a query as well as a characteristic term of the query from the seller data. The characteristic similarity degree determining module determines a characteristic similarity according to the single query and the characteristic term of the target query. The correlation degree determining module determines the correlation degree between the single query and the target query according to the vote similarity degree and the characteristic similarity degree.

For example, the characteristic similarity degree determining module may include a characteristic value calculating unit that calculates a characteristic value of each characteristic term and the characteristic similarity between the single query and the target query according to the characteristic value. The characteristic value is calculated according to click information of the characteristic term and its corresponding query.

For another example, the normalized query determining module may also include a semantic similarity degree determining module and/or a category similarity degree determining module that determines a semantic similarity degree and/or a category similarity degree between the single query and the target query respectively.

The normalized query determining module determines the normalized query of the target query according to the correlation degree and the semantic similarity degree between the single query and the target query. Alternatively, the normalized query determining module determines the normalized query of the target query according to the correlation degree and the category similarity degree between the single query and the target query. Alternatively, the normalized query determining module determines the normalized query of the target query according to the correlation degree, the semantic similarity degree, and the category similarity degree between the single query and the target query.

For example, the semantic similarity degree determining module may include an edit distance determining unit and a normalization processing unit. The edit distance determining unit determines an edit distance between the single query and the target query. The edit distance refers to a minimal number of edit operations to convert one term to another term. The normalization processing unit normalizes the edit distance to obtain the semantic similarity degree with a same quantitative level as the correlation degree.

The query expansion method and system of the present disclosure normalize the queries by utilizing the session information in the search log of the user, and treat queries with same or similar meanings as same or similar queries. After obtaining a query, the present techniques may automatically normalizes the query and expand searches at the same time, and guarantee an accuracy of the search results simultaneously when increasing a range of the search results. The present techniques may use the session information in the search log of the user to conduct normalization, extract the queries included in each session, and analyze user behaviors according to the sequence of the queries, thereby obtaining a change process of queries for each user during search. As a single session records user search information in a shorter and uninterrupted time, a correlation degree between the queries in the single session may be larger. Therefore, the expanded query processing is conducted based on such characteristic of the session information to improve a normalization processing effect and guarantee a sufficiently high correlation degree between the two queries after the normalization, thereby guaranteeing the accuracy of the final search results and reducing search times. Thus, the system resource occupancy is reduced and the system response speed and the query expansion efficiency are improved.

In addition, based on the characteristic of the session information, a probability that queries with a small correlation degree appearing in the same session is reduced. Thus, a data range for the normalization processing is reduced. The processing speed is improved and the processing time is saved.

Furthermore, in addition to taking the session information into consideration for processing, the present techniques may further consider other dimensions such as user click information and seller data to further improve the accuracy of the normalization processing.

Certainly it is not required that any product of the present disclosure possess all of the above features.

BRIEF DESCRIPTION OF THE DRAWINGS

To better illustrate embodiments of the present disclosure, the following is a brief introduction of the FIGs to be used in the description of the embodiments. It is apparent that the following FIGs only relate to some embodiments of the present disclosure. A person of ordinary skill in the art can obtain other FIGs according to the FIGs in the present disclosure without creative efforts.

DETAILED DESCRIPTION

To make the purposes, characteristics and advantages of the present disclosure clearer and easier to understand, the following descriptions are described by reference to the FIGs and some example embodiments.

A query in the present disclosure may be a key term input by a user for querying and obtaining an expected result. For example, the query may include a product name, a product brand, a product model, or other terms. In a special field, the query may be a term of a special category. Using an E-commerce website for example, the query may be a product term that represents a product name or category, such as a mobile phone, a dress, etc. The product term is a common query as the product term may relatively and effectively improve a matching degree between a search result and user expectation.

For example, by analyzing search logs of users, about 57 percent of queries are searched by utilizing the product terms and nearly 88 percent of queries include the product terms. In addition, a product provider in the e-commerce website may describe the product and store the descriptions in a server. The descriptions may include a product name and detailed descriptions of the product. In a general search method, a search engine in the e-commerce website matches the product term input by the user with the product name in the server to obtain a search result according to a matching result. Therefore, to correlate the product term input by the user with information such as the product name stored in the server by the product provider is an important premise for improving the accuracy of the search result.

In addition, information data volumes in some large websites are huge. However, the queries included in the information data are far less than total information data. Thus, if the queries are normalized and the queries representing the same or similar meanings are correlated and considered as same or similar during querying, data redundancy may be further reduced, and the response speed of the search engine may be improved. Using a large e-commerce website for example, its product terms may be far less than the total information data.

Therefore, the present disclosure provides an example query expansion method and system for realizing normalized processing of the queries.

Figure 1:
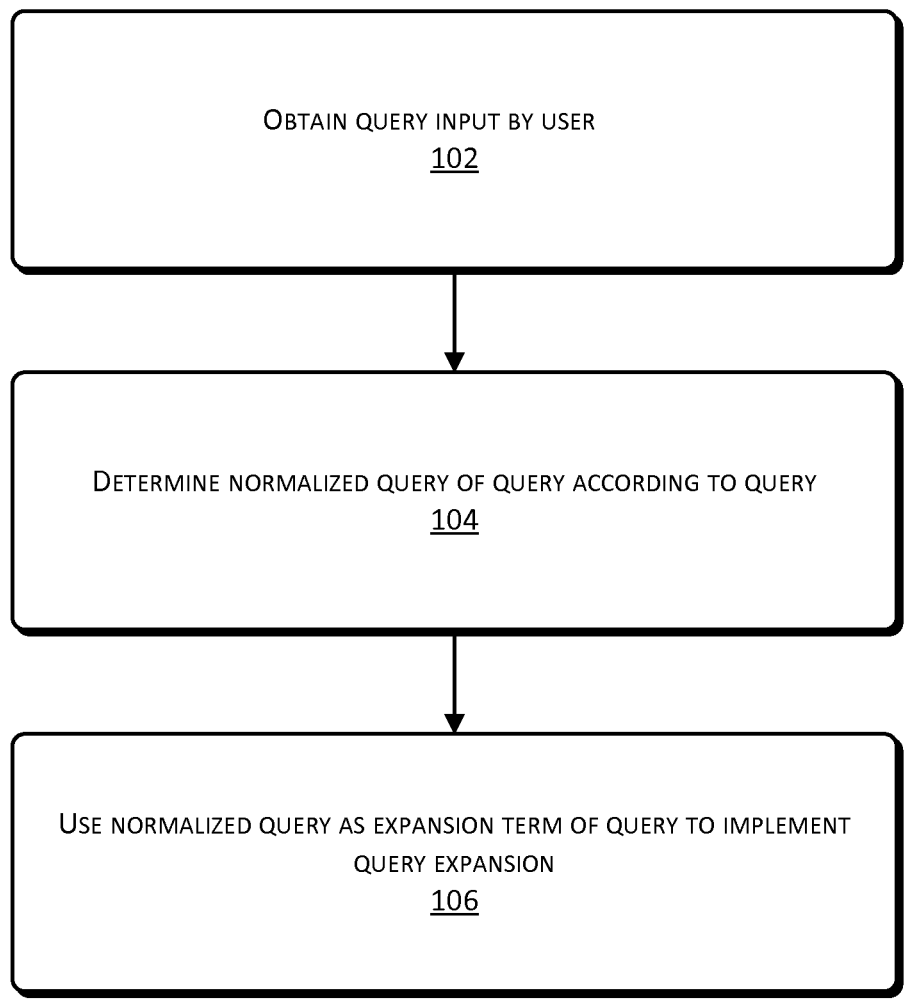
FIG. 1 illustrates a flow chart of an example query expansion method in accordance with a first example embodiment of the present disclosure.
Figure 2:
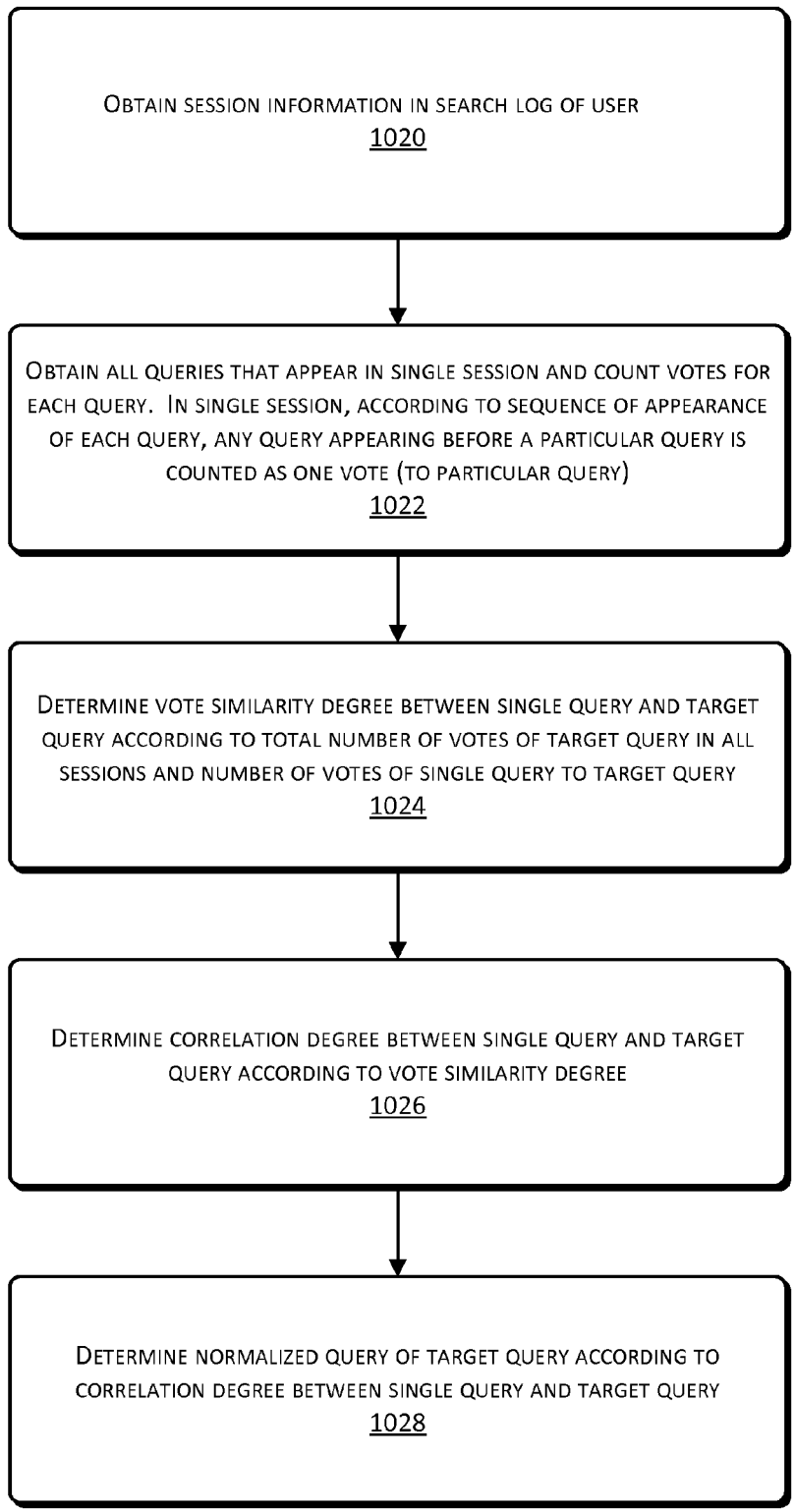
FIG. 2 illustrates a flow chart of an example method for determining a normalized query of a query in accordance with the first example embodiment of the present disclosure.

FIG. 1 and FIG. 2 illustrate an example query expansion method in accordance with a first example embodiment of the present disclosure.

At 102, a query input by a user is obtained.

At 104, a normalized query of the query is determined according to the query.

At 106, the normalized query is used as an expansion term of the query to implement query expansion.

For example, at 104, the operations may include the following.

At 1020, session information in a search log of the user is obtained.

The session information refers to information describing a series of behaviors of a user in a continuous period of time (usually between a few minutes to several hours) at a website. During a whole process for a user starting from browsing a website page to quitting browsing, a website server may automatically assign a session ID to the user, and record user behaviors during the period of time. When the user browses the website page again after a long interval, the website sever may assign another session ID to the user and record user behaviors. In general, the user behaviors in a continuous browsing period of time usually have a certain correlation. That is, the user behaviors in one session are considered to be correlated. Then the queries recorded in the session and used by the user while searching and querying may also have a certain correlation. Therefore, the present disclosure may, for example, implement normalization processing on the queries based on the session information.

The website server may include a specific database for storing a search log of the user including the session information. In order to reduce the data volume, the search logs of the user in a certain period of time may be obtained. Alternatively, the search logs of the user in different periods of time may be obtained, thereby improving objectivity of the data.

At 1022, all queries which appear in the single session are obtained and votes for each query are counted. In a single session, according to a sequence of appearances of each query, any query appearing before a particular query is counted as one vote (to the particular query).

In one session, the user may search a plurality of times, and the session information may include a plurality of queries. The session information may record a search sequence of the user, which is a sequence of appearance of the queries. The sequence of the appearance of the queries may be determined according to each query time recorded in the session information.

An example detailed process of counting the votes for each query is as follows.

The queries are sequenced according to the sequence of appearance of the queries. The vote for a respective query is a total number of queries appearing before the query.

For example, five queries a, b, c, d and e are included in one session and are arranged as a, b, c, d and e according to the sequence of their appearances. According to the above definition, any query before the respective query is counted as a vote to the respective query. That is, for the query b, its vote is 1, i.e., from a to b. For the query c, the vote is 2, i.e., from a to c and from b to c. For the query e, the vote is 4, a vote from a, b, c and d respectively. That is, the vote for the respective query refers to the total number of queries appearing before the respective query.

At 1024, a vote similarity degree between a single query and a target query is determined according to a total number of votes of the target query in all sessions and a number of votes of the single query to the target query.

As a plurality of users may visit the website in the same period of time, a plurality of sessions may exist. A method for counting votes for each query in other sessions may be the same as those described at 1022.

The total number of votes of the target query in all sessions may be counted as follows.

At A1, sessions including the target query are obtained.

At A2, the number of votes of the target query in each session is counted.

At A3, the number of votes in each session is accumulated to obtain the total number of votes of the target query.

According to the above definitions of votes, any query appearing before the target query in each session votes the target query once. For example, each query in each session may count as at most one vote for the target query. If the query appears before the target query, the query votes the target query once; otherwise, the query does not vote the target query. Therefore, when determining the number of votes of the single query to the target query, it may be determined by determining a number of the sessions that include both the single query and the target query and that the single query appears before the target query. Example detailed operations are as follows.

At B1, sessions including both the single query and the target query are obtained.

At B2, it is determined whether the single query votes the target query in a respective session. If a determination result is positive, the respective session is selected.

At B3, a number of all selected sessions is counted to obtain a number of votes of the single query to the target query.

Obtaining the sessions including the target query or the sessions including both the single query and the target query may be implemented by matching. That is, the target query and/or the single query are determined firstly, and the determined terms are matched with all queries included in the session. If the terms are matched, then the session is determined to include the target query or both the single query and the target query respectively.

Other methods may be used to count the total number of votes and the number of votes of the single query to the target query as long as the specific number may be determined.

For example, the votes of each query in each session to the target query may be represented by a route manner. The total number of votes may be counted by counting total routes. The vote of the single query to the target query may be counted and represented by the same route manner and the route is matched with all the previously counted routes. If the routes are matched completely, one vote is counted. A number of the completely matched routes is the number of votes of the single query to the target query.

The vote similarity degree between the single query and the target query may be directly determined according to a proportion of the number of votes of the single query to the target query to the total number of votes of the target query. That is, a specific proportion value is a value of the vote similarity degree. The higher the proportion of the vote of the single query to the target query to the total number of votes of the target query is, the more users adopt the route changes from the single query to the target query and the higher the vote similarity degree between the single query and the target query is.

The vote of the single query to the target query may be different in different sessions. For example, the single query may be directly switched to the target query, or switched by a plurality of times to the target query. For instance, the queries in one session may be a, b and c, and the queries in another session may be a and c. When counting, both sessions include the votes from a to c; however, one of them is spaced by b, while the other is not. Therefore, the two votes from a to c have certain differences. To calculate a correlation degree between the single query and the target query more objectively, example operations may be implemented as follows.

A weight and a base number of each vote to the target query are determined. A score of each vote according to the weight and the base number is calculated. A proportion of a total number of vote scores of the single query to the target query to a total number of vote scores of all queries to the target query is used as the vote similarity degree between the single query and the target query.

During specific calculation, a manner of multiplying the base number of each vote by the weight may be adopted to calculate the score of each vote, and finally the scores are added to obtain the total score. For example, the base number of each vote is supposed to be 1, if a certain query in one session is directly switched into the target query, the weight of the certain query may be set as 1, then a final calculation result of the vote is still 1. If the certain query in another session is switched into the target query after passing through another term, the weight of the certain query may be set as 0.9, then the final calculation result of the vote is 0.9. For another example, if each switch from the certain query to the target query is recorded as a step length, then the weight may be determined as a multiplicative inverse of the step length.

Any other methods may be used to determine the weight as long as they are able to show differences between different votes.

At 1026, the correlation degree between the single query and the target query is determined according to the vote similarity degree.

In one example embodiment, the vote similarity degree between the single query and the target query is the correlation degree between the two.

This example embodiment only considers one dimension which is the vote similarity degree when determining the correlation degree. In some example embodiments, some other dimensions may need to be taken into consideration when determining the correlation degree. The values of the vote similarity degree and numeric value of other dimensions may be normalized to have the same quantitative level to determine a relatively accurate correlation degree.

At 1028, a normalized query of the target query is determined according to the correlation degree between the single query and the target query.

A threshold of the normalized query may be preset. That is, the single query is determined as the normalized query of the target query if a correlation degree value between the single query and the target query exceeds the threshold of the normalized query.

Further, after the single query is determined as the normalized query of the target query, it may be further detailed according to the specific correlation degree value. For example, the normalized query may be detailed into a synonymous normalized query, a correlated normalized query, an expanded normalized query, etc. Value ranges of the categories may be determined respectively. When the correlation degree value is within a certain value range, the category corresponding to the certain value range is determined as a detailed category of the normalized query. For example, if the correlation degree between the single query and the target query is within a value range corresponding to the synonymous normalized query, then the single query is determined as the synonymous normalized query of the target query; if the correlation degree between the single query and the target query is within a value range corresponding to the correlated normalized query, then the single query is determined as the correlated normalized query of the target query; if the correlation degree between the single query and the target query is within a value range corresponding to the expanded normalized query, then the single query is determined as the expanded normalized query of the target query.

The foregoing method implements normalization processing on the query based on the information in the session. The session may record route changes or switches of the queries of different users in one query process. An objective analyzing of the user behaviors may obtain an objective and accurate normalization processing result.

In order to better implement normalization processing of the query, analysis may further be implemented from other dimensions in addition to the information in the session. A normalization processing result may be comprehensively obtained by giving references to the result obtained through the information in the session and other dimensions, thereby improving the objectivity of the processing result. For example, a click behavior of the user may be analyzed or the description information of the query stored in the system may be analyzed.

Figure 3:
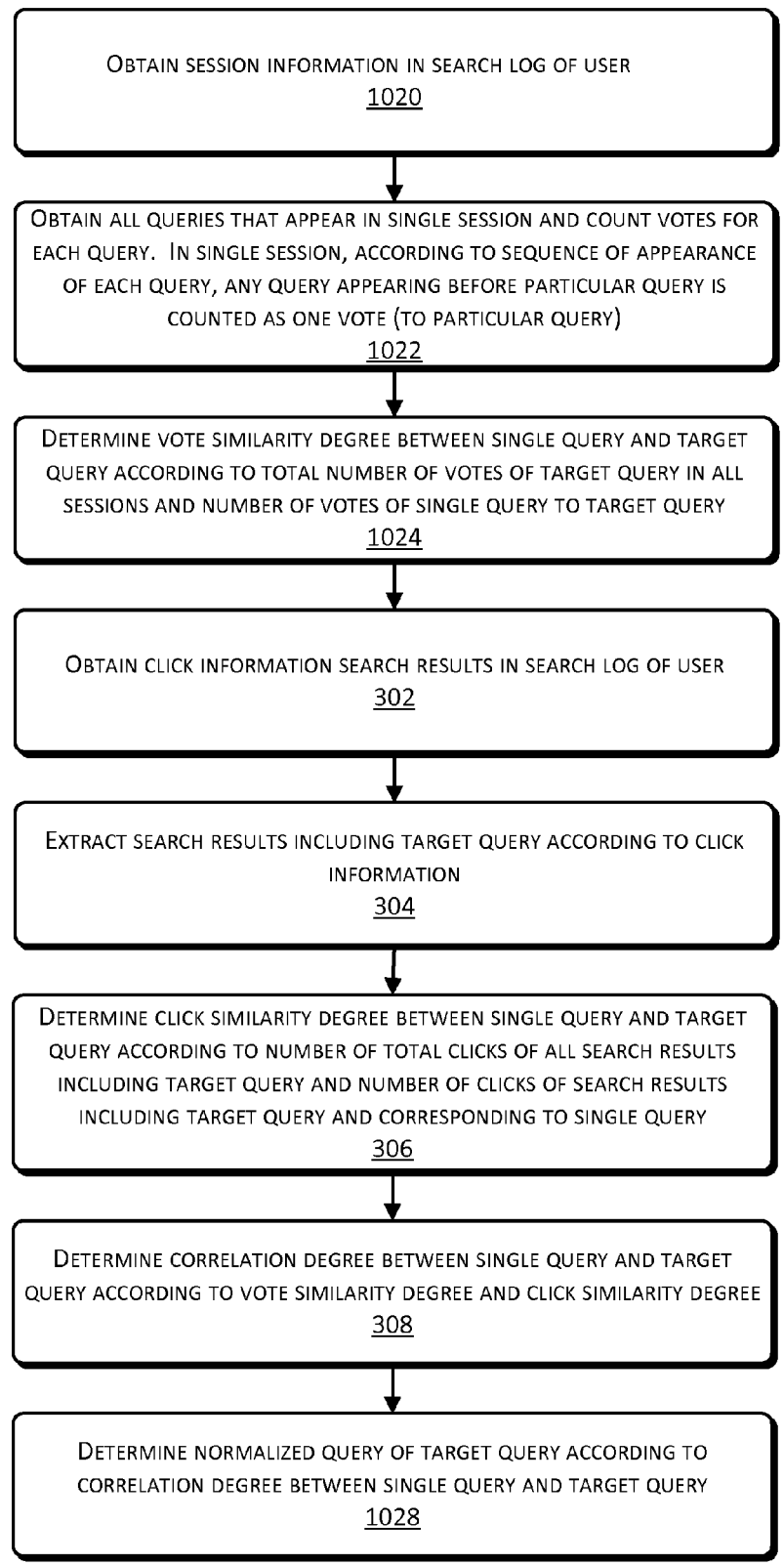
FIG. 3 illustrates a flow chart of another example method for determining the normalized query of the query in accordance with a second example embodiment of the present disclosure.

FIG. 3 illustrates another example query expansion method in accordance with the second example embodiment of the present disclosure. Corresponding to operations at 104 in the first example embodiments, there are following operations before 1026 (which corresponds to 308 at FIG. 3).

At 302, click information of a search result in a search log of a user is obtained.

The user, after using a certain query to search and obtain a search result set, may usually click certain search results in the search result set. Click information of the search results may include the search results that are clicked, titles and description information of the clicked search results, etc.

At 304, a search result including a target query in the click information is extracted.

The search result may include a query which represents a product to be sold in the result. Therefore, the query for each search result may be determined by analyzing the titles and the description information of each search result in the click information. Then the target query may be extracted according to actual needs. For example, the user uses a query "mobile phone" to search and obtain a series of search results while the queries for each search result may be "iPhone™," "Samsung™ mobile phone," "Nokia™ mobile phone," etc. If "iPhone™" is used as the target query, then all search results including "iPhone™" may be extracted.

At 306, a click similarity between the single query and the target query is determined according to a number of total clicks of all search results including the target query and a number of clicks of search results including the target query and corresponding to the single query.

The number of clicks of the search results including the target query and corresponding to the single query refers to a number of clicks of the search results including the target query in the search result set obtained after using the single query for search.

The number of total clicks of all search results including the target query refers to the number of total clicks of all search results corresponding to all queries and including the target query.

For example, if "iPhone™" is the target query, "mobile phone" and "smart phone" are respectively used as the queries for search. One search result set is obtained after using the query "mobile phone" to search, in which a number of clicks of the search results including "iPhone™" is 5. The number of clicks of the search results corresponding to the single query "mobile phone" and including the target query "iPhone™" is 5. In addition, another search result set is obtained after using the query "smart phone" to search, in which a number of clicks of the search results including "iPhone™" is 20. The number of clicks of the search results corresponding to the single query "smart phone" and including the target query "iPhone™" is 20. Then the total number of clicks of all search results including the target query "iPhone™" is 25.

The total number of clicks of all search results including the target query and the clicks of the search results corresponding to the single query and including the target query may be processed as follows. A proportion of the number of clicks of the search results corresponding to the single query and including the target query to the total number of clicks of all search results including the target query is calculated.

This example embodiment considers two dimensions. Thus, similarity values under the two dimensions need to be taken into consideration when the correlation degree between the single query and the target query is determined. Accordingly, operations at 1026 in FIG. 2, corresponding to 308 at FIG. 3, need to be correspondingly modified as determining the correlation degree between the single query and the target query according to the vote similarity degree and the click similarity degree.

For example, a larger value between the vote similarity degree and the click similarity degree may be used as the correlation degree between the single query and the target query.

For another example, weights of the vote similarity degree and a weight of the click similarity degree are determined respectively. The correlation degree between the single query and the target query is obtained by calculating the vote similarity degree and the click similarity degree as well as their respective weight in accordance with one or more preset rules.

Figure 4:
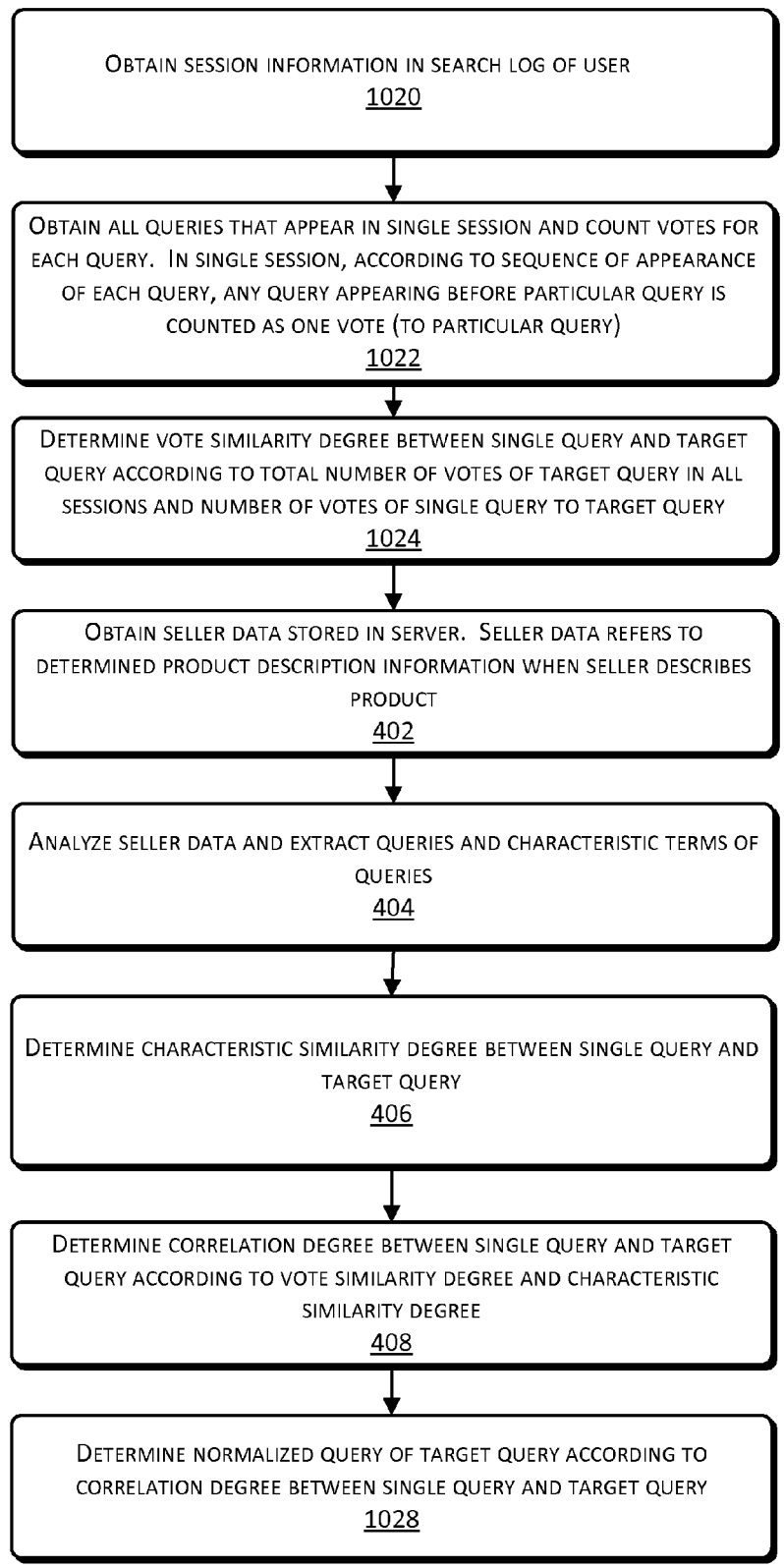
FIG. 4 illustrates a flow chart of another example method for determining the normalized query of the query in accordance with a third example embodiment of the present disclosure.

FIG. 4 illustrates another example query expansion method in accordance with a third example embodiment of the present disclosure. With respect to operations at 104 in the first example embodiment and corresponding operations in the second example embodiment, there are following operations before operations at 1026 in FIG. 2 (corresponding to 408 in FIG. 4).

At 402, seller data stored in a server is obtained. The seller data refers to determined product description information when a seller describes a product.

At 404, the seller data is analyzed and a query as well as a characteristic term of the query is extracted. The characteristic term of the query refers to a term describing characteristics of the query.

At 406, a characteristic similarity degree is determined according to a characteristic term of the single query and a characteristic term of the target query.

For example, the characteristic similarity degree may be determined as follows:

A characteristic value of each characteristic term is determined. The characteristic similarity between the single query and the target query is determined according to the characteristic value.

The characteristic value of each characteristic term may be obtained by calculating mutual information between the characteristic term and the corresponding query. An example calculation formula is as follows:

$$PMI(CP, \text{Word}) = \log\frac{P(CP \& \text{Word})}{P(CP) * P(\text{Word})} \cong \log\frac{N * C(CP \& \text{Word})}{C(CP) * C(\text{Word})}$$

CP represents the query and Word represents a description term. P(CP) and P(Word) respectively represent a probability of each of the two terms independently appears in a data set. P(CP&Word) represents a probability of the two terms appear together in the data set. C(CP) and C(Word) respectively represent information numbers of each of the two terms independently appear in the data set. C(CP&Word) represents information number of the two terms appear together in the data set. N represents a total information number in the data set.

The calculation of characteristic similarity degree between the single query and the target query according to the characteristic value may be considered as a calculation of similarity degree between characteristic terms of each dimension of the single query and the target query to obtain the characteristic similarity degree. For instance, a cosine similarity degree may be used for calculating the characteristic similarity degree. The higher the final value is, the higher the similarity between the two is.

According to the foregoing descriptions, as the seller data is added as a new dimension, the added dimension needs to be taken into consideration while determining the correlation degree between the single query and the target query.

It is understandable that the new dimension may be combined with the first embodiment or combined with the second embodiment. That is, both two dimensions and three dimensions may be taken into consideration. When the new dimension is combined with the first embodiment, operations at 1026 in the first embodiment, corresponding to operations at 408, may be correspondingly modified as follows. The correlation degree between the single query and the target query is determined according to the vote similarity degree and the characteristic similarity degree.

When the three dimensions are combined, operations at 1026 in the first embodiment, corresponding to operations at 408, may be correspondingly modified as follows. The correlation degree between the single query and the target query is determined according to the vote similarity degree, the click similarity degree, and the characteristic similarity degree.

A similar method in the second embodiment may be referenced to determine the correlation degree between the single query and the target query. For example, the one with a higher similarity value may be selected as the correlation degree. Alternatively, weights of each similarity degree may be respectively determined, and then a pre-determined method such as linear fitting may be used for calculation based on the weights and values. For the purpose of brevity, the details are not discussed herein.

For another example, other factors may further be taken into consideration in addition to the correlation degree when normalization processing is implemented, thereby making a processing result more accurate. For example, a semantic similarity degree between the single query and the target query, or a category similarity degree between the single query and the target query, etc., may further be taken into consideration.

Thus, before operations 1028 at the first example embodiment, the second example embodiment, and/or the third example embodiment, the following operations may be performed.

The semantic similarity between the single query and the target query is determined. For example, the semantic similarity between the single query and the target query may be determined according to an edit distance. The edit distance refers to a minimal number of edit operations to convert one character strings to another character string (or query). A Levenshtein distance is an example edit distance. The edit operations in Levenshtein include substituting one character to another character, inserting one character, and deleting one character. The edit distance between the two character strings may be calculated through a dynamic planning method. After the edit distance is calculated, normalization processing is applied to the edit distance to obtain the semantic similarity degree so that the semantic similarity may have the same quantitative level as the correlation degree, thereby providing convenience for subsequent processing.

Alternatively, before operations 1028 at the first example embodiment, the second example embodiment, and/or the third example embodiment, the following operations may be performed.

The category similarity between the single query and the target query is determined.

For example, at the e-commerce website, categories may be preset in order to classify and manage products. Each query has a category to which it belongs. Generally, the categories may be divided into a plurality of levels. That is, one first level category may include a plurality of second level categories, and each second level category may be further divided into a plurality of third level categories, etc. The category similarity degree may be determined by judging whether the queries belong to the same first level category, second level category, third level category, etc. Similarly, the normalization processing is applied to the category similarity degree during a determining process so that the category similarity degree has the same quantitative level as the correlation degree.

As one or more new factors are taken into consideration, the operations at 1028 in the foregoing three embodiments may be correspondingly modified.

If the correlation degree and the semantic similarity degree are taken into consideration, then the operations at 1028 may be modified as determining the normalized query of the target query according to the correlation degree and the semantic similarity degree between the single query and the target query.

If the correlation degree and the category similarity degree are taken into consideration, then the operations at 1028 may be modified as determining the normalized query of the target query according to the correlation degree and the category similarity degree between the single query and the target query.

If the three are all taken into consideration simultaneously, then the operations at 1028 may be modified as determining the normalized query of the target query according to the correlation degree, the semantic similarity degree, and the category similarity degree between the single query and the target query.

For example, during detailed processing, linear fitting may be applied to the two or the three factors to obtain a normalization score of the single query and the target query, and the normalized query of the target query is determined according to the normalization score.

For example, by reference to the first example embodiment, the threshold may be used for implementation. That is, a threshold of the normalized query is preset. The single query is determined as the normalized query of the target query if the normalization score exceeds the threshold. Moreover, the normalized query may be further categorized. That is, different value ranges corresponding to different categories are respectively set. When the normalization score is in a certain value range, the category corresponding to the value range is determined as a detailed category of the normalized query. The specific method in the first embodiment may be referenced. For purpose of brevity, details are not discussed herein.

It is understandable that with respect to the above operations added before certain specific operations of a certain example embodiment, as such added operations are mutually independent from the certain specific operations, such added operations may be implemented before the specific operations, or be implemented synchronously with those operations before the specific operations or before those operations before the specific operations. The present disclosure does not impose any restriction herein. For example, with respect to the operations from 302 to 306, which are added in the second example embodiment, they may be implemented between the operations at 1024 and the operations at 1028. Alternatively, they may be synchronously implemented with the operations from 1020 to 1024. Alternatively, they may be implemented before the operations at 1020. The present disclosure does not impose any restriction herein. The other example embodiments may have similar processing, which are not detailed herein.

Figure 5:
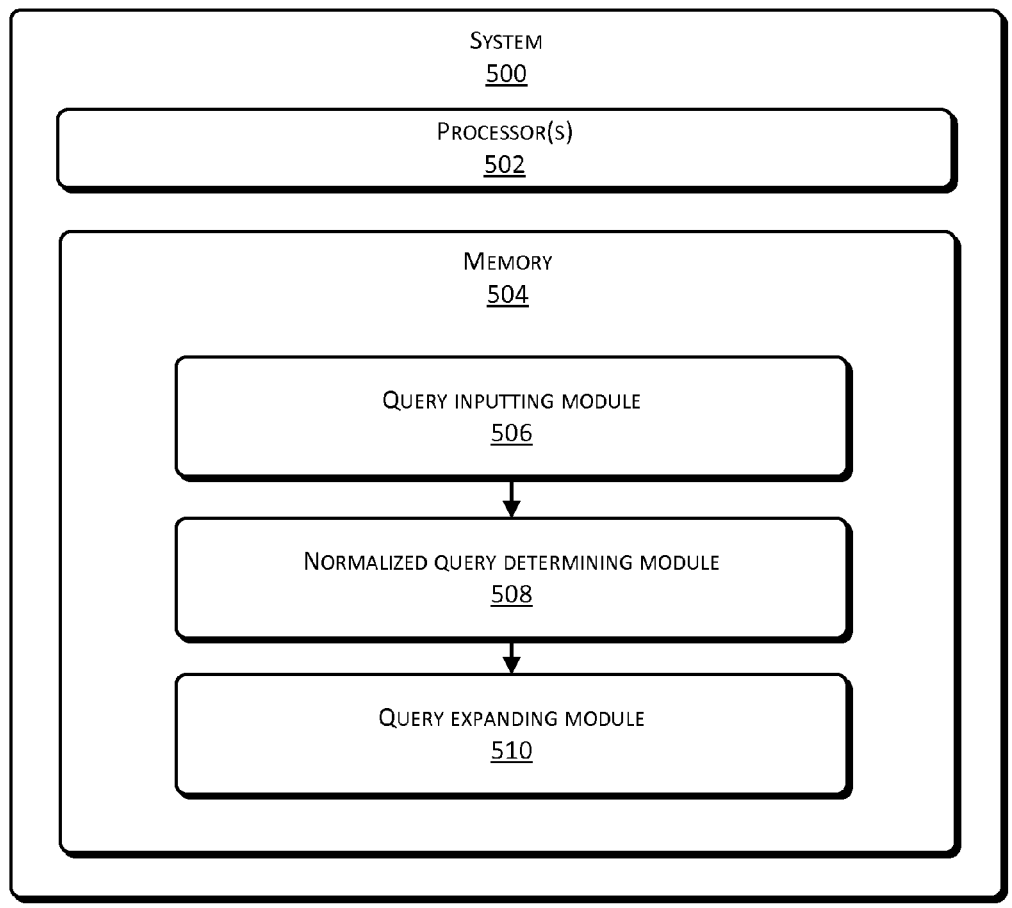
FIG. 5 illustrates a diagram of an example query expansion system in accordance with the present disclosure.

FIG. 5 illustrates a first example query expansion system 500 in accordance with the present disclosure. The system 500 may include one or more processor(s) 502 and memory 504. The memory 504 is an example of computer-readable media. As used herein, "computer-readable media" includes computer storage media and communication media.

Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media. The memory 204 may store therein program units or modules and program data.

In the example of FIG. 5, the memory 504 may store therein a query inputting module 506, a normalized query determining module 508, and a query expanding module 510.

The query inputting module 506 obtains a query input by a user. The normalized query determining module 508 determines a normalized query of the query according to the query. The query expanding module 510 uses the normalized query as an expansion term of the query to implement query expansion.

Figure 6:
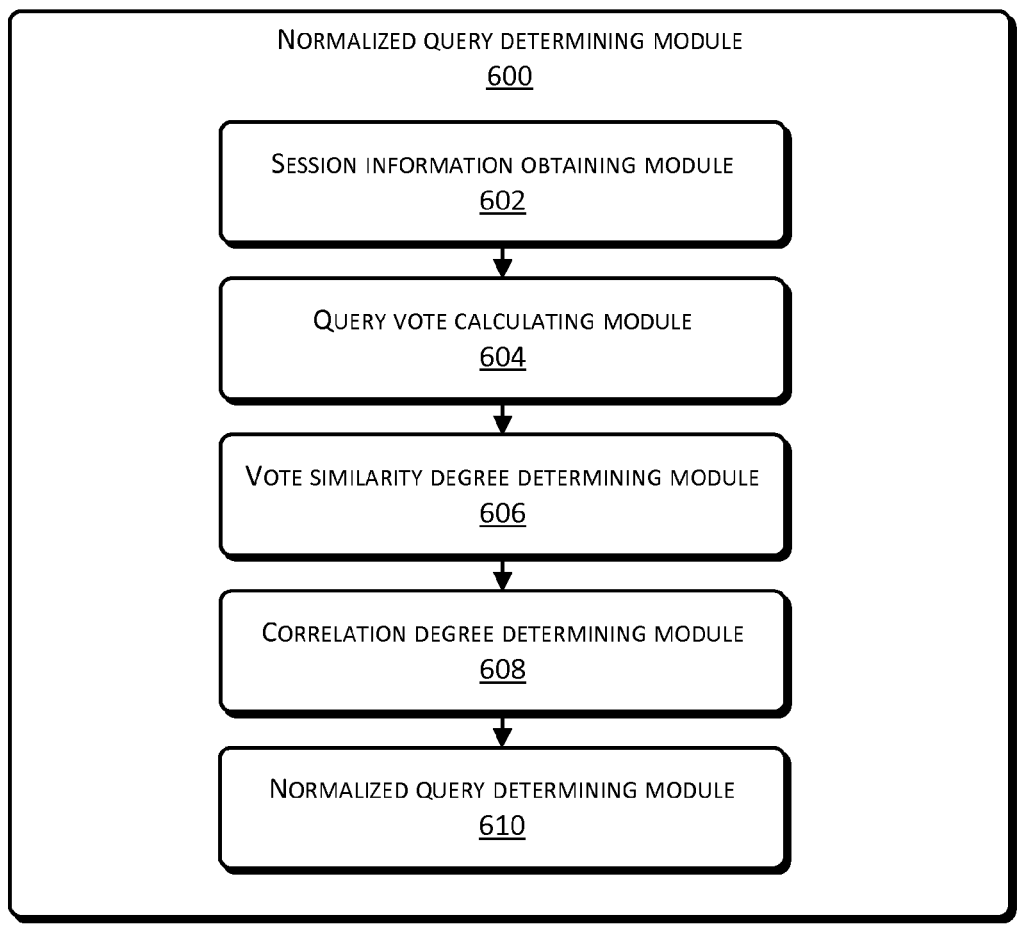
FIG. 6 illustrates a diagram of a first example normalized query determining module in accordance with the present disclosure.

FIG. 6 illustrates an example normalized query determining module 600. The example normalized query determining module 600 may include a session information obtaining module 602, a query vote calculating module 604, a vote similarity degree determining module 606, a correlation degree determining module 608, and a normalized query determining module 610.

The session information obtaining module 602 obtains session information from a search log of the user.

The query vote calculating module 604 obtains all the queries that appear in a single session, and counts votes for each query. In a single session, according to a sequence of appearances of each query, any query appearing before a particular query is counted as one vote (to the particular query).

The vote similarity degree determining module 606 determines a vote similarity degree between a single query and a target query according to a total number of votes of the target query in all sessions and a number of votes of the single query to the target query. For example, the vote similarity degree determining module 606 may include a base number and weight determining unit, a score calculating unit, and a proportion calculating unit. The base number and weight determining unit determines a weight and a base number of each vote to the target query. The score calculating unit calculates a score of each vote according to the weight and the base number. The proportion calculating unit uses a proportion of a total number of vote scores of the single query to the target query to a total number of vote scores of all the queries to the target query as the vote similarity degree between the single query and the target query.

The correlation degree determining module 608 determines a correlation degree between the single query and the target query according to the vote similarity degree.

The normalized query determining module 610 determines a normalized query of the target query according to the correlation degree between the single query and the target query.

For example, the normalized query determining module 610 may include a normalized query threshold setting unit that sets a threshold of the normalized query and determines the single query as the normalized query of the target query if a correlation degree value between the single query and the target query exceeds the threshold of the normalized query.

For another example, the normalized query determining module 610 may also include a normalized query category classifying unit, a value range setting unit, and a category determining unit. The normalized query category classifying unit divides normalized query categories into a synonymous normalized query, a correlated normalized query, and an expanded normalized query. The value range setting unit sets value ranges of the three categories according to correlation degree values in a descending order. The category determining unit determines a category corresponding to a value range to which the correlation degree between the single query and the target query belongs as a detailed category of the single query and the target query.

Figure 7:
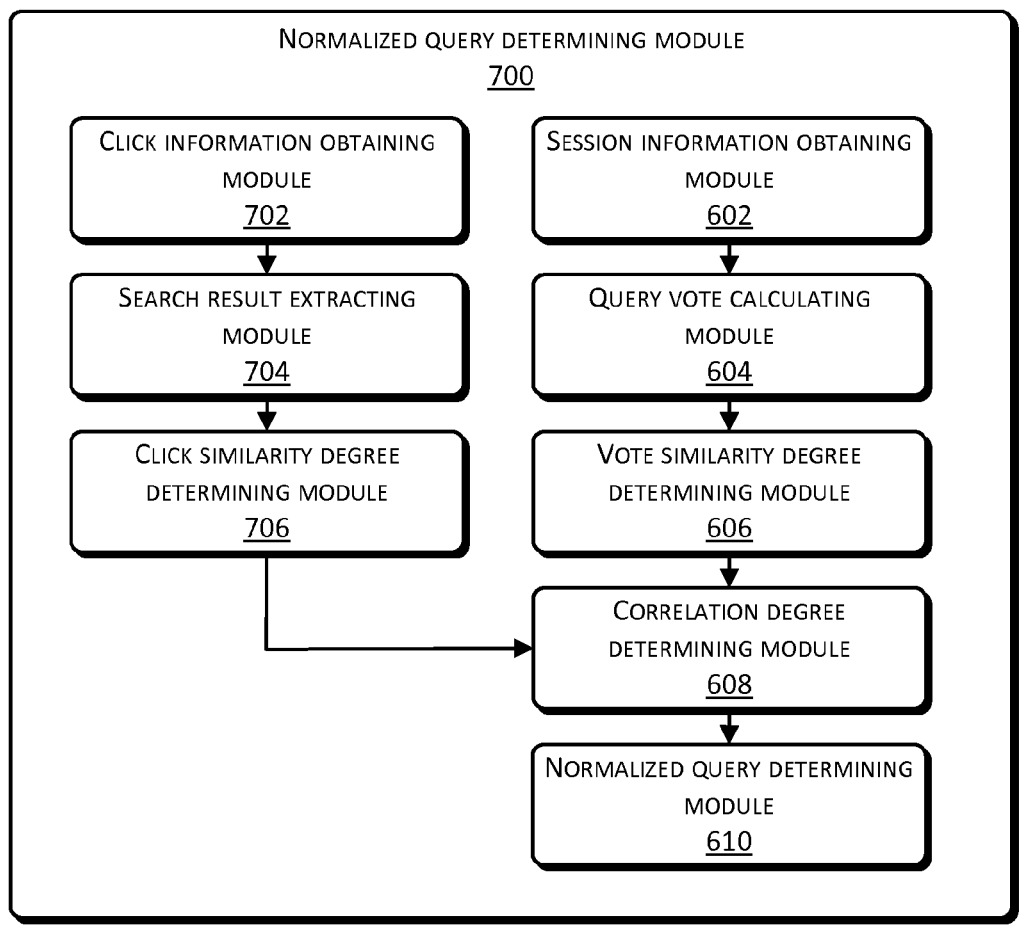
FIG. 7 illustrates a diagram of a second example normalized query determining module in accordance with the present disclosure.

FIG. 7 illustrates a second example query expansion system including a second example normalized query determining module 700. In addition to the session information obtaining module 602, the query vote calculating module 604, the vote similarity degree determining module 606, the correlation degree determining module 608, and the normalized query determining module 610, the normalized query determining module 700 further includes a click information obtaining module 702, a search result extracting module 704, and a click similarity degree determining module 706. The click information obtaining module 702 obtains click information of search results from the search log of the user. The search result extracting module 704 extracts search results including the target query from the click information. The click similarity degree determining module 706 determines a click similarity degree between the single query and the target query according to a number of total clicks of search results including the target query and a number of total clicks of search results including the target query and corresponding to the single query. The correlation degree determining module 610 determines the correlation degree between the single query and the target query according to the vote similarity degree and the click similarity degree.

Figure 8:
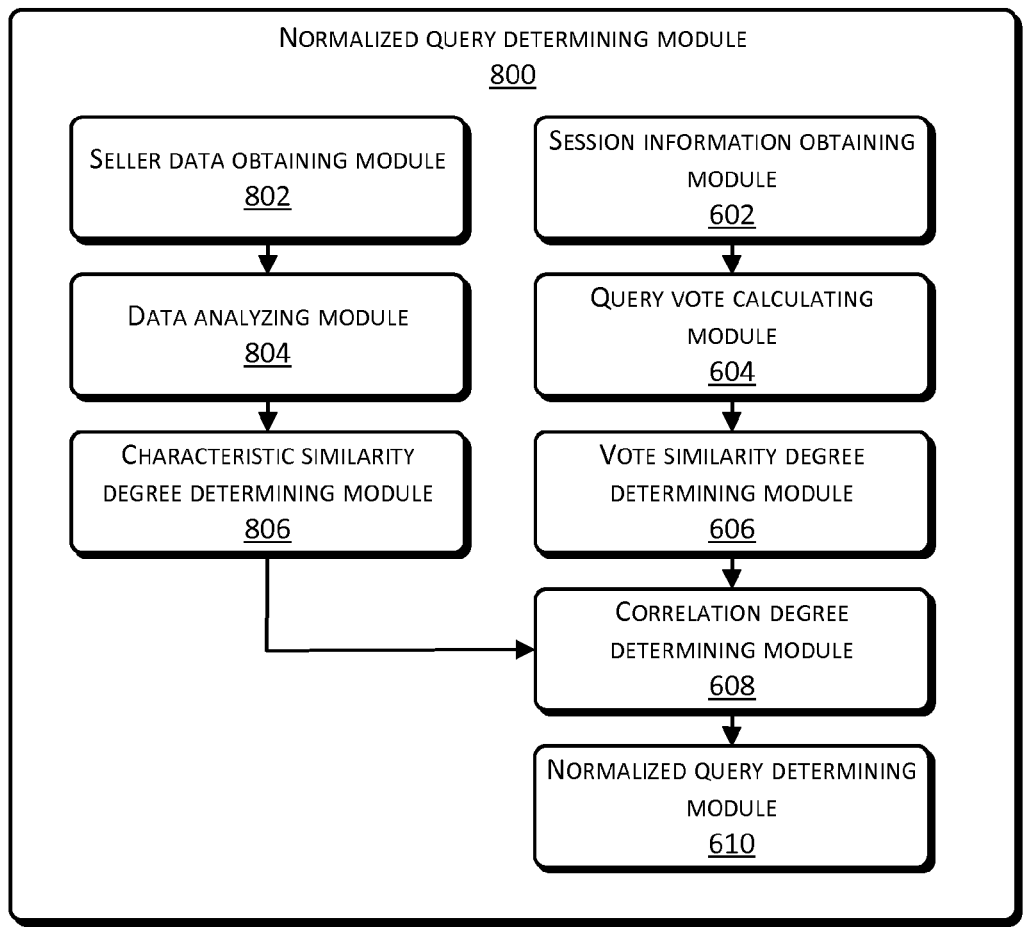
FIG. 8 illustrates a diagram of a third example normalized query determining module in accordance with the present disclosure.

FIG. 8 illustrates a third example query expansion system including a third example normalized query determining module 800. In addition to the session information obtaining module 602, the query vote calculating module 604, the vote similarity degree determining module 606, the correlation degree determining module 608, and the normalized query determining module 610, the normalized query determining module 800 further include a seller data obtaining module 802, a data analyzing module 804, and a characteristic similarity degree determining module 806.

The seller data obtaining module 802 obtains seller data stored in a server. The seller data includes determined product description information when a seller describes a product.

The data analyzing module 804 analyzes the seller data and extracts a query as well as a characteristic term of the query from the seller data.

The characteristic similarity degree determining module 806 determines a characteristic similarity according to the characteristic terms of the single query and the target query. For example, the characteristic similarity degree determining module 806 may include a characteristic value calculating unit that calculates a characteristic value of each characteristic term. The characteristic value is calculated according to mutual information of the characteristic term and its corresponding query.

The correlation degree determining module 608 determines the correlation degree between the single query and the target query according to the vote similarity degree and the characteristic similarity degree.

It is understandable that relevant data described in the second example embodiment and the third example embodiment may be further taken into consideration simultaneously for processing. That is, the correlation degree determining module 608 may further determine the correlation degree between the single query and the target query according to the vote similarity degree, the click similarity degree, and the characteristic similarity degree. During detailed correlation degree determining, the largest one among the three may be used as the correlation degree. Alternatively, linear fitting may be applied to the three to obtain a final value as the correlation degree.

It is understandable that when the vote similarity degree is combined with the click similarity degree or the characteristic similarity degree, the larger one between the two may be selected as the correlation degree. Alternatively, linear fitting may be applied to the two to obtain a final value as the correlation degree.

For another example, one or more of the example systems may further include a semantic similarity degree determining module and/or a category similarity degree determining module that determines a semantic similarity degree and/or a category similarity between the single query and the target query respectively.

Correspondingly, the normalized query determining module 610 may determine the normalized query of the target query according to the correlation degree and the semantic similarity degree between the single query and the target query, determine the normalized query of the target query according to the correlation degree and the category similarity degree between the single query and the target query, or determine the normalized query of the target query according to the correlation degree, the semantic similarity degree, and the category similarity degree between the single query and the target query.

For example, the semantic similarity degree determining module may include an edit distance determining unit and a normalization processing unit. The edit distance determining unit determines an edit distance between the single query and the target query. The edit distance refers to a minimal number of edit operations to convert one term to another term. The normalization processing unit implements normalization processing of the edit distance to obtain a semantic similarity degree with the same quantitative level as the correlation degree.

All of the example embodiments in the present disclosure are described progressively. Each example embodiment emphasizes its differences from the other example embodiments. The same or similar parts of the example embodiments may be mutually referenced. As the example system embodiments are basically similar to the example method embodiments, the example system embodiments are not described in detail. The relevant parts may be referenced to those in the example method embodiments.

Some example query expansion methods and the systems of the present disclosure are not detailed herein. The present disclosure describes the principles and implementation of the present techniques by using some examples. The example embodiments are merely intended to help understand the methods and core concepts of the present disclosure. Meanwhile, one of ordinary skill in the art may modify or change the example embodiments or application scopes according to the concepts of the present disclosure, which shall still fall into the protection scope of the present disclosure. The present disclosure shall not be understood as a restriction to the present techniques.

What is claimed is:

1. A method comprising:
   obtaining a target query; and
   determining a normalized query according to the obtained target query, the determining including:
   obtaining session information in a search log;
   determining a vote similarity degree between a single query and the target query based on the session information, including:
   obtaining all queries appearing in a single session,
   calculating a number of votes for each query, the calculating including counting the single query appearing before the target query in the single session as a vote from the single query to the target query, and
   determining the vote similarity degree between the single query and the target query according to the calculated number of votes;
   determining a correlation degree between the single query and the target query based in part on the vote similarity degree; and determining the normalized query based in part on the correlation degree between the single query and the target query.

2. The method as recited in claim 1, further comprising using the normalized query as an expansion term of the obtained target query.

3. The method as recited in claim 1, wherein the determining the vote similarity degree between the single query and the target query according to the calculated number of votes is based on a number of total votes of the target query in all sessions and a number of votes of the single query to the target query.

4. The method as recited in claim 3, further comprising calculating the number of total votes of the target query in all sessions, including:
   obtaining one or more sessions including the target query;
   counting a number of votes of the target query in each session; and
   accumulating the number of votes of the target query in each respective session to obtain the number of total votes of the target query.

5. The method as recited in claim 3, further comprising calculating the number of votes of the single query to the target query, including:
   obtaining one or more sessions that include the single query and the target query;
   determining whether the single query votes the target query in a respective session;
   selecting, in response to determining that the single query votes the target query in the respective session, the respective session; and
   counting a number of selected sessions to obtain the number of votes of the single query to the target query.

6. The method as recited in claim 1, wherein the determining the vote similarity degree between the single query and the target query according to the calculated number of votes comprises using a proportion of a number of total votes of the single query to the target query to a number of total votes of the target query as the vote similarity degree between the single query and the target query.

7. The method as recited in claim 1, wherein the determining the vote similarity degree between the single query and the target query further comprises:
   determining a weight and a base number of each vote of the target query;
   calculating a score of each vote according to the respective weight and the respective base number; and
   using a proportion of a total vote score of the single query to the target query to a total vote score of all queries to the target query as the vote similarity degree between the single query and the target query.

8. The method as recited in claim 1, wherein the determining the normalized query based in part on the correlation degree between the single query and the target query comprises:
   setting a threshold of normalized query; and
   determining, in response to a determination that a value of the correlation degree between the single query and the target query exceeds the threshold of normalized query, the single query as the normalized query of the target query.

9. The method as recited in claim 1, wherein the determining the normalized query based in part on the correlation degree between the single query and the target query comprises:
   dividing categories of the normalized query into a synonymous normalized query, a correlated normalized query, and an expanded normalized query;
   setting respective value ranges of the synonymous normalized query, the correlated normalized query, and the expanded normalized query according to correlation degree values in a descending order; and
   using a category corresponding to a value range to which the correlation degree between the single query and the target query belongs as a detailed category of the single query and the target query.

10. The method as recited in claim 1, further comprising:
    obtaining click information of search results in the search log;
    extracting one or more search results including the target query according to the click information; and
    determining a click similarity degree between the single query and the target query according to
      a number of total clicks of search results including the target query, and
      a number of clicks of search results corresponding to the single query and including the target query,
    wherein the determining the correlation degree between the single query and the target query is based on the vote similarity degree and the click similarity degree.

11. The method as recited in claim 10, wherein the determining the correlation degree between the single query and the target query based on the vote similarity degree and the click similarity degree comprises selecting a largest value between the vote similarity degree and the click similarity degree as the correlation degree between the single query and the target query.

12. The method as recited in claim 10, wherein the determining the correlation degree between the single query and the target query based on the vote similarity degree and the click similarity degree further comprises:
    determining a weight of the vote similarity degree and the click similarity degree respectively; and
    calculating the correlation degree between the single query and the target query according to the vote similarity degree and the click similarity degree and their respective weights in accordance with one or more preset rules.

13. The method as recited in claim 1, further comprising:
    obtaining seller data stored in a server, the seller data including product description information;
    analyzing the seller data to extract queries and characteristic terms of the queries; and
    determining a characteristic similarity degree according to respective characteristic terms of the single query and the target query,
    wherein the determining the correlation degree between the single query and the target query is based on the vote similarity degree and the characteristic similarity degree.

14. The method as recited in claim 13, wherein the determining the characteristic similarity degree according to the respective characteristic terms of the single query and the target query comprises:
    calculating a characteristic value of each characteristic term based on mutual information between each respective characteristic term and a query corresponding to each respective characteristic term; and
    calculating the characteristic similarity degree between the single query and the target query according to the characteristic values.

15. The method as recited in claim 1, further comprising:
determining a semantic similarity degree between the single query and the target query,
wherein the determining the normalized query of the target query is based on the correlation degree and the semantic similarity degree between the single query and the target query.

16. The method as recited in claim 1, further comprising:
determining a category similarity degree between the single query and the target query,
wherein the determining the normalized query of the target query is based on the correlation degree and the category similarity degree between the single query and the target query.

17. The method as recited in claim 1, further comprising:
determining a semantic similarity degree between the single query and the target query; and
determining a category similarity degree between the single query and the target query,
wherein the determining the normalized query of the target query is based on the correlation degree, the semantic similarity degree, and the category similarity degree between the single query and the target query.

18. A method comprising:
obtaining session information in a search log;
determining a vote similarity degree between a single query and a target query based on the session information, including:
  obtaining all queries appearing in a single session,
  calculating a number of votes for each query, the calculating including counting the single query appearing before the target query in the single session as a vote from the single query to the target query, and
  determining the vote similarity degree between the single query and the target query according to the calculated number of votes;
determining a correlation degree between the single query and the target query based on the vote similarity degree;
determining a semantic similarity degree between the single query and the target query; and
determining a normalized query based on the correlation degree and the semantic similarity degree between the single query and the target query.

19. The method as recited in claim 18, wherein the determining the semantic similarity degree between the single query and the target query comprises:
determining an edit distance between the single query and the target query, the edit distance being a number of minimal edit operations times to change one term to another term; and
normalizing the edit distance to obtain the semantic similarity degree that has a same quantity level as the correlation degree.

20. A system for expanding a query, the system comprising:
one or more processors;
a memory device communicatively coupled with the one or more processors;
a query inputting module having instructions, executable by the one or more processors, to obtain a target query;
a normalized query determining module having instructions, executable by the one or more processors, to determine a normalized query according to the obtained target query; and
a query expanding module having instructions, executable by the one or more processors, to use the normalized query as an expansion term of the obtained target query to implement query expansion,
wherein the determining the normalized query according to the obtained target query includes:
  obtaining session information in a search log,
  determining a vote similarity degree between a single query and a target query based on the session information, including:
    obtaining all queries appearing in a single session,
    calculating a number of votes for each query, the calculating including counting the single query appearing before the target query in the single session as a vote from the single query to the target query, and
    determining the vote similarity degree between the single query and the target query according to the calculated number of votes;
  determining a correlation degree between the single query and the target query based in part on the vote similarity degree, and
  determining the normalized query based in part on the correlation degree between the single query and the target query.

* * * * *